United States Patent [19]

Hosokawa et al.

[11] 4,355,002
[45] Oct. 19, 1982

[54] NUCLEAR FUEL ASSEMBLY

[75] Inventors: Takanori Hosokawa, Hitachi; Hideo Maki; Katsutoshi Shinbo, both of Katsuta, all of Japan

[73] Assignee: Hitachi, Ltd., Tokyo, Japan

[21] Appl. No.: 841,738

[22] Filed: Oct. 13, 1977

Related U.S. Application Data

[63] Continuation of Ser. No. 626,275, Oct. 28, 1975, abandoned.

[30] Foreign Application Priority Data

Oct. 28, 1974 [JP] Japan .................................. 49-123378

[51] Int. Cl.$^3$ .............................................. G21C 3/00
[52] U.S. Cl. .................................... 376/419; 376/428; 376/435; 376/447
[58] Field of Search ....................... 176/68, 71, 77, 78, 176/79, 93 BP; 376/419, 428, 435, 447

[56] References Cited

U.S. PATENT DOCUMENTS

| | | | |
|---|---|---|---|
| 3,147,191 | 9/1964 | Crowther | 176/68 |
| 3,799,839 | 3/1974 | Fischer | 176/68 |
| 3,849,248 | 11/1974 | Channon | 176/68 |
| 3,933,582 | 1/1976 | MacNabb | 176/68 |

OTHER PUBLICATIONS

Glasstone, "Sourcebook on Atomic Energy", 2nd Ed., D. Van Nostrand Co., Inc., p. 452.
Barth et al.; "Power-Flattening Techniques", Nucleonics, May, 1965, vol. 25, No. 5, pp. 72–73.

*Primary Examiner*—Donald P. Walsh
*Attorney, Agent, or Firm*—Antonelli, Terry & Wands

[57] ABSTRACT

First nuclear fuel elements in which a fissionable material in which a burnable poison is incorporated is loaded and second nuclear fuel elements in which a fissionable material in which no burnable poison is incorporated is loaded are disposed in a nuclear fuel assembly. Content of the fissionable material in the first nuclear fuel element is less than about 72% of that of the fissionable material in the second nuclear fuel element adjacent to the first nuclear fuel element.

18 Claims, 5 Drawing Figures

NUCLEAR FUEL ASSEMBLY

This is a continuation of application Ser. No. 626,275, filed Oct. 28, 1975, now abandoned.

BACKGROUND OF THE INVENTION

The present invention relates to a nuclear fuel assembly which is loaded with nuclear fuel elements in which a burnable poison is incorporated and more particularly it concerns a nuclear fuel assembly having little possibility of nuclear fuel elements within which burnable poison is added failing.

A nuclear fuel assembly used in a boiling water reactor comprises nuclear fuel elements, an upper tie-plate, a lower tie-plate, a channel box and a spacer. The nuclear fuel element is formed by loading plural $UO_2$ pellets within a fuel cladding, providing an end plug at both ends of the fuel cladding and sealing them by welding. The $UO_2$ pellets are formed by molding powders of uranium dioxide and sintering it. Zircaloy-2 is used for the fuel cladding. Within the nuclear fuel assembly, roughly classified, two kinds of nuclear fuel elements are loaded. One of them is a nuclear fuel element which comprises $UO_2$ pellets to which gadolinium oxide ($Gd_2O_3$), a burnable poison, is added (which is referred to as gadolinium-nuclear fuel element hereinafter). Another one is a nuclear fuel element which comprises $UO_2$ pellets to which no gadolinium oxide is added (which is referred to as non-gadolinium-nuclear fuel element hereinafter). Addition of gadolinium oxide to $UO_2$ pellets is for controlling excess reactivity of the nuclear fuel assembly at the beginning of burning of the nuclear fuel assembly and smoothing the power of nuclear fuel assembly in the horizontal direction. About 2-5 gadolinium-nuclear fuel elements are loaded within the nuclear fuel assembly.

As the results of various researches on characteristics of a nuclear fuel assembly constructed as mentioned above, it has been found that the gadolinium-nuclear fuel element more easily fails than the nongadolinium-nuclear fuel element. When nuclear fuel elements fail, fissionable material present therein, and fission products accumulated therein by nuclear fission, leak out of the nuclear fuel element. This is apt to cause environmental contamination and markedly reduces the safety of nuclear reactor. The nuclear fuel assembly containing failed nuclear fuel element must be substituted with fresh nuclear fuel assembly. This causes prolongation of shut-down periods of nuclear reactors and reduction in operation rates of the nuclear reactors.

SUMMARY OF THE INVENTION

It is an object of the present invention to improve the safety of a nuclear reactor.

It is another object of the present invention to reduce the possibility of failure of nuclear fuel elements loaded with fissionable materials in which burnable poison is incorporated.

It is another object of the present invention to adjust the content of fissionable material in the nuclear fuel element loaded with fissionable material in which a burnable poison is incorporated.

The characteristic of the present invention resides in making the content of fissionable material in the first nuclear fuel element containing a burnable poison smaller than that of fissionable material in the second nuclear fuel element which is adjacent to the first nuclear fuel element and which contains no burnable poison. Preferably, the content of the fissionable material in the first nuclear fuel element is less than about 72% of the content of the fissionable material in the second nuclear fuel element. Thus, possibility of failure of the first nuclear fuel element is markedly decreased.

DESCRIPTION OF THE PREFERRED EMBODIMENTS

The present invention has been attained by examining the possibility of failure of nuclear fuel element containing burnable poison and of nuclear fuel element containing no burnable poison.

Figure 1:
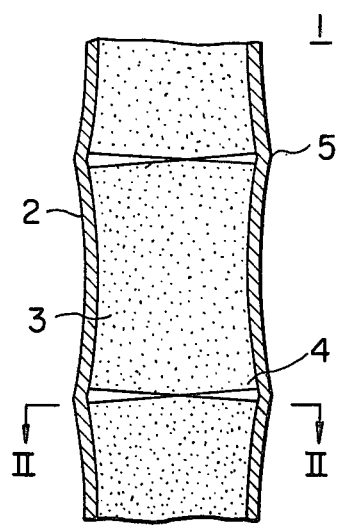
FIG. 1 is a partially schematic, vertical section of a nuclear fuel element which illustrates a state of deformation of $UO_2$ pellets and fuel cladding.
Figure 2:
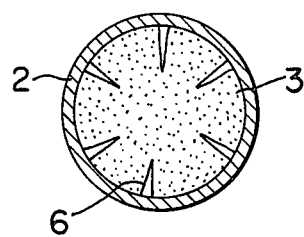
FIG. 2 is a section of the nuclear fuel element of FIG. 1 cut at II—II.

Failure of nuclear fuel elements will be explained below. When nuclear fuel assembly is loaded within core of a nuclear reactor and operation of the nuclear reactor is started, there is the possibility of the nuclear fuel elements being deformed and failed as mentioned below. That is, deformation of columnar $UO_2$ pellets 3 charged in fuel cladding 2 of nuclear fuel element 1 acts on the fuel cladding 2 to cause deformation of the fuel cladding 2 as shown in FIG. 1. $UO_2$ pellets 3 are deformed due to the difference in thermal expansion caused by the difference in temperature, i.e., temperature of the central part of $UO_2$ pellets 3 being higher than that of the circumferential part and due to expansion of the volume of $UO_2$ pellets 3 caused by accumulation of fission products in the pellets. Thus, the cross sectional area of $UO_2$ pellets 3 at both ends becomes greater than that of $UO_2$ pellets 3 at the central portion in the axial direction. Ridge portion 4 is formed at the outer circumference of both ends of $UO_2$ pellets and thus the cross-sectional area at said portions of $UO_2$ pellets 3 is increased. In this way, deformation of $UO_2$ pellets 3 proceeds and $UO_2$ pellets 3 are allowed to contact with fuel cladding 2. Soon, fuel cladding 2 is expanded out by the ridge portions 4 formed at $UO_2$ pellets 3. Thus, ridge portions 5 are formed at fuel cladding 2, too and appearance of fuel cladding 2 becomes like that of a bamboo, namely, the fuel cladding appears to have nodes. Rate of thermal expansion of $UO_2$ pellets 3 is greater than that of fuel cladding 2. Therefore, when the deformation as mentioned above occurs in fuel cladding 2, a tensile stress occurs in fuel cladding 2 in its axial direction due to thermal expansion of $UO_2$ pellets 3. Furthermore, owing to the difference in thermal expansion of central part and circumferential part of $UO_2$ pellets 3, a compressive stress occurs at the central part of a high temperature and a tensile stress at the circumferential part of a low temperature. Therefore, as shown in FIG. 2, cracks 6 are formed in $UO_2$ pellets 3 and a tensile stress occurs also in the circumferential direction of fuel cladding 2. Interaction of the tensile stresses in axial direction and in circumferential direction which occur in fuel cladding 2 causes concentration of the greatest local strain at the portions of ridge portions 5 of fuel cladding 2 which face cracks 6. In this way, failure of fuel cladding 2 occurs.

In the nuclear fuel assembly loaded in a nuclear reactor are charged gadolinium-nuclear fuel elements containing burnable poison gadolinium oxide and nongadolinium-nuclear fuel elements containing no burnable poison. The nongadolinium-nuclear fuel element is arranged adjacent to the gadolinium-nuclear fuel element. After said nuclear fuel assembly was loaded in a core of a nuclear reactor, the nuclear reactor was operated and amount of elongation of the fuel cladding of each nuclear fuel element was measured. Uranium-235 of about 2.8% in enrichment and 1.5% of gadolinium oxide were contained in the gadolinium-nuclear fuel element and uranium-235 of about 2.8% in enrichment was contained in the nongadolinium-nuclear fuel element which contained no gadolinium oxide. Said uranium-235 is a fissionable material.

Figure 3:
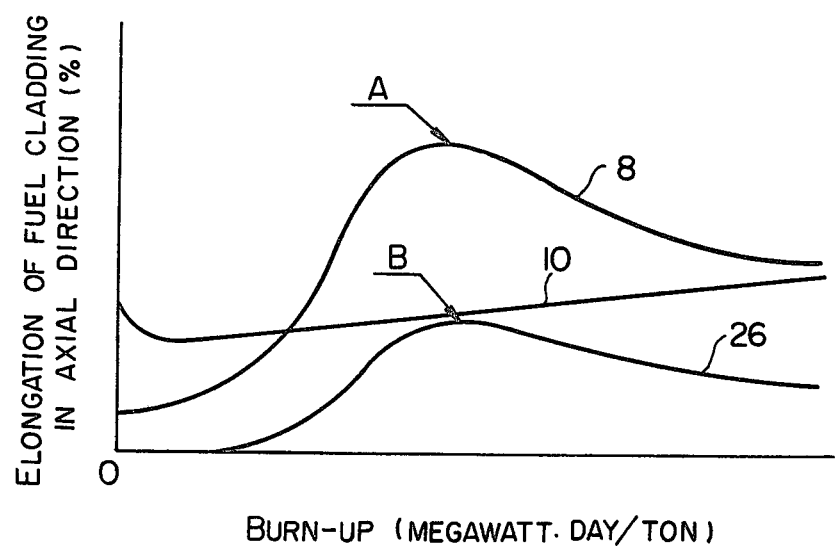
FIG. 3 is a characteristic graph which shows the relation between burn-up and elongation of a fuel cladding in its axial direction.

FIG. 3 shows the relation between burn-up and elongation of the fuel cladding in its axial direction (which is referred to as merely elongation hereinafter) in the gadolinium-nuclear fuel element and nongadolinium-nuclear fuel element. Curve 8 indicates the changes in elongation of the fuel cladding of the gadolinium-nuclear fuel element. Curve 10 indicates the changes in elongation of the fuel cladding of the nongadolinium-nuclear fuel element. The elongation of the gadolinium-nuclear fuel element is smaller than that of the non-gadolinium-nuclear fuel element at a low burn-up. However, when the burn-up exceeds about 3000 megawatt.day/ton, the elongation of the gadolinium-nuclear fuel element becomes larger than that of the non-gadolinium-nuclear fuel element. The amount of gadolinium oxide in the gadolinium-nuclear fuel element decreases with increase in the burn-up. The elongation of the fuel cladding of the gadolinium-nuclear fuel element increases with decrease in the amount of gadolinium oxide. The elongation of the fuel cladding of the gadolinium-nuclear fuel element reaches maximum value, namely, about 0.0612% at a burn-up at which gadolinium oxide is lost, namely, a burn-up of about 5000–6000 megawatt.day/ton. After the elongation of the fuel cladding of the gadolinium-nuclear fuel element reaches the maximum point A, the elongation decreases with increase in the burn-up and closes to the elongation of the fuel cladding of the nongadolinium-nuclear fuel element. This is due to the stress relaxing phenomenon caused by creep deformation of the gadolinium-nuclear fuel element. The elongation of the fuel cladding of the nongadolinium-nuclear fuel element is about 0.0276% at the burn-up at which the elongation of the fuel cladding of the gadolinium-nuclear fuel element reaches the maximum point A. That is, the elongation of the fuel cladding of the gadolinium-nuclear fuel element is markedly greater than that of the fuel cladding of the nongadolinium-nuclear fuel element at a burn-up of about 5000–6000 megawatt.day/ton. The elongation of the fuel cladding occurs due to both thermal expansion and elongation of $UO_2$ pellets in the axial direction as the result of action of deformation of $UO_2$ pellets on the fuel cladding. Elongation of the fuel cladding of the gadolinium-nuclear fuel element occurs mainly due to the latter cause. When the elongation due to the latter cause is great, tensile stress which occurs at ridge portions 5 of fuel cladding 2 is increased to result in increase in the possibility of failure of the nuclear fuel element. Thus, the possibility of the gadolinium-nuclear fuel element being failed is greater than the possibility of the nongadolinium-nuclear fuel element being failed.

As the result of various researches for reducing the possibility of the gadolinium-nuclear fuel element being failed, it has been found that reduction of the failure can be attained by rendering the content of fissionable material in the gadolinium-nuclear fuel element smaller than that of fissionable material in the nongadolinium-nuclear fuel element.

Figure 4:
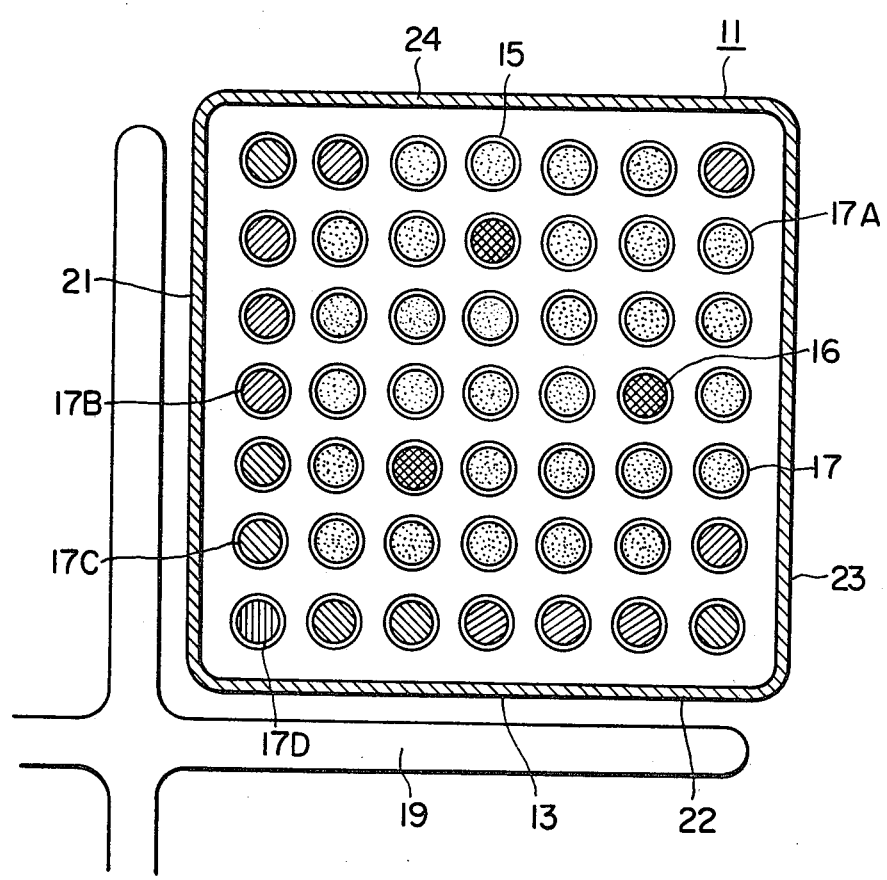
FIG. 4 is a cross-section of one suitable embodiment of the present nuclear fuel assembly.

One suitable example of the present invention will be explained with reference to FIG. 4. FIG. 4 shows cross-section of nuclear fuel assembly 11. Nuclear fuel assembly 11 comprises channel box 13 in which many nuclear fuel elements are loaded. Although not shown in the drawing, lower part of nuclear fuel elements 15 is attached to a lower tie plate and upper part thereof is attached to an upper tie plate. Nuclear fuel element 15 is held by spacers between the upper and lower parts. Cooling water flows through channel box 13 of the nuclear fuel assembly arranged in the core of the nuclear reactor. Nuclear fuel elements in nuclear fuel assembly 11 are roughly classified into gadolinium-nuclear fuel elements 16 and nongadolinium-nuclear fuel elements 17 as mentioned hereinbefore. In this example, nongadolinium-nuclear fuel elements 17 are also classified into four kinds depending upon the difference in enrichment of uranium-235 which is a fissionable material contained in the elements. That is, in nuclear fuel assembly 11 there are loaded nongadolinium-nuclear fuel elements 17A containing uranium-235 of about 2.8% in enrichment, nongadolinium-nuclear fuel element 17B containing uranium-235 of about 2.1% in enrichment, nongadolinium-nuclear fuel elements 17C containing uranium-235 of about 1.8% in enrichment and nongadolinium-nuclear fuel elements 17D containing uranium-235 of about 1.4% in enrichment.

Many nuclear fuel assemblies 11 are regularly arranged in lattice state in the core of a nuclear reactor. Control rod 19 is inserted in the spaces formed by the four nuclear fuel assemblies 11 for controlling the power of the nuclear reactor. Near side walls 21 and 22 of channel box 13 which are opposite to control rod 19, mainly nongadolinium-nuclear fuel elements 17B, 17C and 17D are disposed. Nongadolinium-nuclear fuel elements 17A are disposed in the remaining area of channel box 13 and up to near side walls 23 and 24 of channel box 13 which are opposite to side walls 21 and 22. Such disposition of nongadolinium-nuclear fuel elements 17 results from consideration on smoothing the power of nuclear fuel assembly 11 in horizontal direction. Gadolinium-nuclear fuel elements 16 contain about 1.5% of gadolinium oxide and moreover contain uranium-235 of about 2.0% in enrichment. The three gadolinium-nuclear fuel elements 16 are disposed between nongadolinium-nuclear fuel elements 17 as shown in FIG. 4. Disposition of gadolinium-nuclear fuel elements 16 and nongadolinium-nuclear fuel elements 17 in channel box 13 is the same as the conventional manner. Furthermore, enrichment of uranium-235 contained in each nongadolinium-nuclear fuel element 17 is also the same as in the conventional elements. Enrichment of uranium-235 contained in gadolinium-nuclear fuel element 16 is lower than that of uranium-235 contained in non gadolinium-nuclear fuel element 17A which is adjacent to the gadolinium-nuclear fuel element 16. Such reduction in enrichment means reduction in content of uranium-235 in the nuclear fuel elements.

When a nuclear reactor having nuclear fuel assembly 11 disposed in a core is operated, elongations of fuel claddings of gadolinium-nuclear fuel element 16 and nongadolinium-nuclear fuel element 17A adjacent to the element 16 are as shown in FIG. 3. Elongation of the fuel cladding of nongadolinium-nuclear fuel element 17A increases with increase in the burn-up as shown by curve 10 as in the conventional manner. On the other hand, elongation of the fuel cladding of gadolinium-nuclear fuel element 16 changes with increase in the burn-up as shown by curve 26. Elongation of the fuel cladding of gadolinium-nuclear fuel element 16 also becomes maximum at a burn-up of about 5000–6000 megawatt.day/ton like elongation of a fuel cladding of conventional gadolinium-nuclear fuel element which is shown by curve 8. However, the value of the maximum point B of curve 26 is markedly smaller than the value of maximum point A. Moreover, at the same burn-up, elongation of the fuel cladding at the maximum point B of curve 26 is smaller than that of the fuel cladding of nongadolinium-nuclear fuel element 17A adjacent to gadolinium-nuclear fuel element 16. This is because enrichment of uranium-235 contained in gadolinium-nuclear fuel element 16 is about 2.0%, which is lower than about 2.8% of uranium-235 contained in non-gadolinium-nuclear fuel element 17A adjacent to element 16. Elongation of the fuel cladding of gadolinium-nuclear fuel element 16 becomes closest to that of the fuel cladding of nongadolinium-nuclear fuel element 17A at a burn-up of about 5000–6000 megawatt.day/ton, but the former is extremely lower than the latter at a burn-up outside said range. Therefore, the possibility of gadolinium-nuclear fuel element 16 being failed is markedly reduced. Furthermore, the number of times for substitution of nuclear fuel assembly 11 disposed in a core with fresh nuclear fuel assembly is decreased and the possibility of reduction in operation rate of nuclear reactor is decreased.

Enrichment of uranium-235 contained in gadolinium-nuclear fuel element 16 should preferably be less than about 72% of enrichment of uranium-235 contained in nongadolinium-nuclear fuel element 17A adjacent to element 16. Thus, the possibility of gadolinium-nuclear fuel element 16 being failed can be reduced to less than the possibility of nongadolinium-nuclear fuel element 17A being failed by previously adjusting enrichment of uranium-235 contained in gadolinium-nuclear fuel element 16.

When enrichment of uranium-235 contained in gadolinium-nuclear fuel element 16 is about 2.4%, elongation of the fuel cladding of gadolinium-nuclear fuel element 16 at the maximum point B is greater than that of the fuel cladding of nongadolinium-nuclear fuel element 17A adjacent to element 16. However, when enrichment of uranium-235 contained in gadolinium-nuclear fuel element 16 is less than about 2.8%, the value of the maximum point B is smaller than that of the maximum point A. That is, when enrichment of uranium-235 contained in gadolinium-nuclear fuel element 16 is less than that of uranium-235 contained in non-gadolinium-nuclear fuel element 17A adjacent to element 16, the possibility of gadolinium-nuclear fuel element 16 being failed becomes smaller than the conventional nuclear fuel element. As nuclear fuel assembly 11, the possibility of failure of this nuclear fuel assembly 11 is also reduced than the conventional assembly.

As mentioned before, content of uranium-235 in the nuclear fuel element can be made lower by decreasing enrichment of fissionable material contained in the nuclear fuel elements, namely, uranium-235. Furthermore, content of uranium-235 in the nuclear fuel element can be made small by decreasing packing density of uranium dioxide in the nuclear fuel element.

Figure 5:
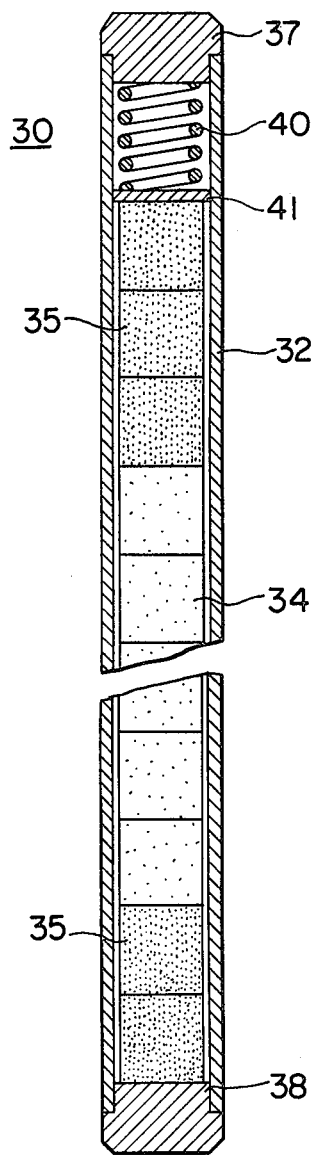
FIG. 5 is a vertical section of another embodiment of the present nuclear fuel assembly.

FIG. 5 shows gadolinium-nuclear fuel element 30 which is applied to a nuclear fuel assembly and which is another example of the present invention. Gadolinium-nuclear fuel element 30 comprises fuel cladding 32, $UO_2$ pellets 34 and 35 and end plugs 37 and 38. $UO_2$ pellets 34 and 35 are loaded in fuel cladding 32. End plugs 37 and 38 are attached to both ends of fuel cladding 32 and are sealed by welding. Coil spring 40 is disposed at the upper part of gadolinium-nuclear fuel element 30. Coil spring 40 holds down $UO_2$ pellets 34 and 35 through wafer 41. Enrichment of uranium-235 contained in $UO_2$ pellets 34 is about 2.0%. Enrichment of uranium-235 contained in $UO_2$ pellets 35 is about 2.8%. About 1.5% of gadolinium oxide is contained in $UO_2$ pellets 34 and 35. $UO_2$ pellets 34 are disposed in the central part of gadolinium-nuclear fuel element 30. $UO_2$ pellets 35 are disposed at the upper and lower parts of gadolinium-nuclear fuel element 30. Gadolinium-nuclear fuel elements 30 are inserted in place of above mentioned gadolinium-nuclear fuel elements 16 to constitute a nuclear fuel assembly. Other constitutions of the nuclear fuel assembly are the same as those of nuclear fuel assembly 11. In the upper and lower parts of gadolinium-nuclear fuel element 30, there is contained uranium-235 having the same enrichment as that of uranium-235 contained in nongadolinium-nuclear fuel element 17A which is adjacent to element 30. However, enrichment of uranium-235 contained in the central part of gadolinium-nuclear fuel element 30 is lower than that of uranium-235 contained in nongadolinium-nuclear fuel element 17 which is adjacent to element 30.

When the nuclear fuel assemblies are loaded in core of a nuclear reactor and operation of the nuclear reactor is started, distribution of power of the nuclear fuel element in its axial direction is high in the central part of the nuclear fuel element and low in the upper and lower parts. Therefore, the possibility of failure in the upper and lower parts of the nuclear fuel element is low.

This example which was made taking the above matters into consideration results in the similar effects to those of the example shown in FIG. 4. Furthermore, in this example, since enrichment of uranium-235 present in both end parts of gadolinium-nuclear fuel element 30 is high, there is obtained the effect that excess reactivity becomes greater than in the previous example.

The present invention can also be applied when boron, cadmium, erbium, europium, hofnium, samarium, chemical compounds of them, and other non-fissionable materials having high thermal neutron absorption cross section are used in place of gadolinium oxide as a burnable poison. The present invention can also be applied to nuclear fuel assemblies of nuclear reactors other than boiling water reactors.

According to the present invention, the possibility of failure of nuclear fuel element containing burnable poison can be reduced and reliability of nuclear fuel assembly can be improved. This also results in increase in safety of nuclear reactors.

What is claimed is:

1. In a nuclear fuel assembly including first nuclear fuel elements containing fissionable material and a non-fissionable burnable poison, and second adjacent nuclear fuel elements containing the same fissionable material as contained in said first nuclear fuel elements but being free of said non-fissionable burnable poison, the improvement comprising the enrichment of said fissionable material in said first nuclear fuel elements at zero megawatt.day/ton burn-up being less than the enrichment of said same fissionable material in said second adjacent nuclear fuel elements at zero megawatt.day/ton burn-up, whereby the danger of damage to said first nuclear fuel elements is reduced.

2. A nuclear fuel assembly according to claim 1, wherein the enrichment of said fissionable material in said first nuclear fuel elements is less than about 72% of the enrichment of said fissionable material in said second adjacent nuclear fuel elements.

3. A nuclear fuel assembly according to claim 2, wherein said nuclear fuel elements are in the form of axially elongated rods, and wherein the enrichment of fissionable material in the axially middle portions of said first nuclear fuel elements is less than the enrichment of fissionable material in the same portion of said second adjacent nuclear fuel elements.

4. A nuclear fuel assembly according to claim 3, wherein the enrichment of fissionable material in said axially middle portions of said first nuclear fuel elements is less than the enrichment of the same fissionable material in the axially end portions of said first nuclear fuel elements.

5. A nuclear fuel assembly according to claim 3, wherein the enrichment of fissionable material in said axially middle portions of said first nuclear fuel elements is less than about 72% of the enrichment of fissionable material in said second adjacent nuclear fuel elements.

6. A nuclear fuel assembly according to claim 5, wherein the enrichment of fissionable material in said axially middle portions of said first nuclear fuel elements is less than the enrichment of the same fissionable material in the axially end portions of said first nuclear fuel elements.

7. A nuclear fuel assembly according to claim 3, wherein said fissionable material contained in said first and second nuclear fuel elements is present in pellets of $UO_2$, and wherein said non-fissionable burnable poison contained in said first nuclear fuel elements is gadolinium oxide.

8. A nuclear fuel assembly according to claim 1, wherein said first nuclear fuel elements contain a single fissionable material.

9. A nuclear fuel assembly according to claim 1, wherein said nuclear fuel elements are in the form of axially elongated rods, and wherein the enrichment of said fissionable material in the axially middle portions of said first nuclear fuel elements is less than the enrichment of said fissionable material in identical portions of said second adjacent nuclear fuel elements.

10. A nuclear fuel assembly according to claim 9, wherein the enrichment of said fissionable material in the axially middle portions of said first nuclear fuel elements is less than about 72% of the enrichment of said second adjacent nuclear fuel elements.

11. A nuclear fuel assembly according to claim 1, wherein said second adjacent nuclear fuel elements are arranged adjacently surrounding each of said first nuclear fuel elements.

12. A nuclear fuel assembly according to claim 1, wherein said fissionable material contained in said first and second nuclear fuel elements is present in pellets of $UO_2$, and wherein said non-fissionable burnable poison contained in said first nuclear fuel elements is gadolinium oxide.

13. A nuclear fuel assembly according to claim 12, wherein the enrichment of said fissionable material in said first nuclear fuel elements is less than about 72% of the enrichment of said fissionable material in said second adjacent nuclear fuel elements.

14. A nuclear fuel assembly according to claim 1, wherein said nuclear fuel elements are in the form of axially elongated rods.

15. A nuclear fuel assembly according to claim 1, wherein said non-fissionable burnable poison is a material having a high thermal neutron absorption cross-section.

16. A nuclear fuel assembly according to claim 15, wherein said non-fissionable burnable poison is a material containing at least one of boron, cadmium, erbium, europium, hafnium, samarium, and chemical compounds thereof.

17. In a nuclear fuel assembly including first nuclear fuel elements containing fissionable material and a non-fissionable burnable poison, and second adjacent nuclear fuel elements containing the same fissionable material as contained in said first nuclear elements but being free of said non-fissionable burnable poison, a method for preventing failure of said first nuclear fuel elements comprising the step of loading fissionable material in said first nuclear fuel elements so that the enrichment of the fissionable material in said first nuclear fuel elements at zero megawatt.day/ton burn-up is less than the enrichment of the same fissionable material in said second adjacent nuclear fuel elements at zero megawatt.day/ton burn-up, whereby the danger of damage to said first nuclear fuel elements is reduced.

18. A method according to claim 17, wherein the enrichment of fissionable material loaded in said first nuclear fuel elements is less than about 72% of the enrichment of fissionable material in said second adjacent nuclear fuel elements.

* * * * *